Patented Jan. 17, 1939

2,144,552

UNITED STATES PATENT OFFICE 2,144,552

ALKANOL-AMINE SALT OF MANDELIC ACID

Horace A. Shonle, Indianapolis, Ind., assignor to Eli Lilly and Company, Indianapolis, Ind., a corporation of Indiana No Drawing. Application June 24, 1937, Serial No. 150,129

4 Claims. (Cl. 260—501)

It is the object of my invention to produce alkanol-amine salts of mandelic acid, and therapeutically effective mixtures thereof with acidifying agents, especially suitable for urinary antisepsis.

It is known that the sodium and ammonium salts of mandelic acid are effective in the treatment of urinary infections.

However, both sodium mandelate and ammonium mandelate are objectionable from certain standpoints; and my invention makes available mandelates which avoid those objections. Sodium mandelate is objectionable because the presence of the sodium opposes the acidification of the urine, necessary for the effective action of the mandelic acid; so that in order for it to be effective it is necessary that relatively large quantities of some acidifying agent be also administered, involving unduly large dosages and sometimes undesirable side effects. Ammonium mandelate is objectionable because it is hard to obtain and maintain in dry form in a pure state, because it tends to lose ammonia on standing, and because it is hygroscopic.

Thus neither sodium mandelate nor ammonium mandelate is available to produce a dry, non-hygroscopic powder which does not oppose acidification of the urine and which can be administered in a form which will pass through the stomach into the intestines, as by being enteric-coated.

I have found that certain alkanol-amine mandelates may be made which are advantageous in urinary antisepsis, and which in addition are free from the objections noted above for sodium mandelate and in some instances from the objections noted above for ammonium mandelate.

Examples of the alkanol-amine salts which I find desirable are the mono-ethanol-amine salt, the di-ethanol-amine salt, the mono-isopropanol-amine salt, and the tri-isopropanol-amine salt; and of these the most desirable is the mono-ethanol-amine salt.

These alkanol-amine salts of mandelic acid may be prepared by producing a reaction between mandelic acid and an alkanol amine, desirably in the presence of a solvent, such as alcohol or water. This is preferably done by dissolving molecular quantities of the desired alkanol amine and of the mandelic acid in suitable solvents which are miscible with each other, and mixing the solutions. For example, the alkanol amine may be dissolved in ethyl alcohol, and the mandelic acid in ether. Preferably the alcoholic solution of the alkanol amine is added gradually to the ether solution of the mandelic acid, in the cold, with suitable stirring or other agitation. The alkanol amine reacts with the mandelic acid to form the alkanol-amine salt of mandelic acid, which salt is insoluble in ether but soluble in alcohol. Because of these solubilities, the mixture of solvents in making the new salt is conveniently predominantly ether. If necessary additional ether may be added to completely precipitate any of the salt which may otherwise tend to remain in solution. This new salt is suitably separated from the liquid by filtration or decantation. It may be washed with an additional amount of ether, after which it is dried. If alcohol or water is used as the solvent, the salt may be obtained in solid form by evaporating the solvent, desirably under vacuum; or the solution may be administered without obtaining the solid salt.

When the alkanol amine used is mono-ethanol amine, the new mono-ethanol-amine salt of mandelic acid produced is a white solid, which melts at about 107° to 108° C., uncorrected. It is soluble in water and alcohol, and insoluble in ether. It is non-hygroscopic, does not lose the ethanol amine on standing, and forms a water solution which has a more pleasant taste than does a water solution of either ammonium mandelate or sodium mandelate.

When the alkanol amine used is di-ethanol amine, mono-isopropanol amine, or tri-isopropanol amine, the new salts are usually obtained as white or pale yellow viscous masses. They are soluble in water and alcohol, and insoluble in ether. They do not appear to have definite melting points.

These alkanol-amine salts of mandelic acid are found to be effective on oral administration in combating urinary antisepsis. Any of them may be orally administered. The mono-ethanol-amine salt of mandelic acid, being obtainable as a stable non-hygroscopic solid, lends itself readily to being formed into enteric-coated tablets; which on administration pass substantially without change through the stomach and into the intestines before being absorbed, and thus avoid any possible tendency toward gastric disturbance.

If the urinary infection is of B. coli, the alkanol-amine salt in itself is usually sufficient to produce adequate acidification of the urine to enable the mandelate to be effective in combating the infection; in which case ordinarily no additional acidifying agent is required for simultaneous administration. However, if the infection is of *B. proteus,* such infection causes fermentation of the urine in the bladder, and a resultant production of such high alkalinity in such urine that the mandelate is unable to act effectively against the infection. Therefore, when the infection is of *B. proteus,* it is desirable to administer with the mandelate a suitable amount of an acidifying agent, such as ammonium chloride or ammonium nitrate, but relatively small amounts of it are needed in comparison to the amount which is needed when sodium mandelate is administered. The mono-ethanol-amine salt of mandelic acid and the desired amount of ammonium chloride may be put into the same enteric-coated tablet so that the ammonium chloride as well as the mandelic acid passes through the stomach without absorption.

While the proportion of ammonium chloride to the mono-ethanol-amine salt of mandelic acid may be varied to suit conditions, I find it advantageous to use about one gram of the acidifying agent, such as ammonium chloride or ammonium nitrate, to about 2 to 5 grams of the mono-ethanol-amine salt of mandelic acid, to produce a uniform mixture which is put up in enteric-coated tablets. Such tablets, administered orally, are found effective, in the majority of cases, in the treatment of infection with either *B. coli* or *B. proteus.*

I claim as my invention:

1. An alkanol-amine salt of mandelic acid, in which the alkanol group is a lower alkanol group.

2. The mono-ethanol-amine salt of mandelic acid.

3. A stable, non-hygroscopic, white, ethanol-amine mandelate.

4. An alkanol-amine salt of mandelic acid, in which the alkanol group contains between 2 and 9 carbon atoms.

HORACE A. SHONLE.